(12) United States Patent
Peck

(10) Patent No.: US 6,606,491 B1
(45) Date of Patent: Aug. 12, 2003

(54) SUBSCRIBER VALIDATION METHOD IN CELLULAR COMMUNICATION SYSTEM

(75) Inventor: Richard W. Peck, Cary, NC (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/105,218

(22) Filed: Jun. 26, 1998

(51) Int. Cl.$^7$ .................................. H04M 1/66
(52) U.S. Cl. ................. 455/411; 455/432; 455/435
(58) Field of Search ........................ 455/411, 410, 455/422, 432, 433, 435, 550, 551, 552, 553; 380/347–255, 270, 247, 249, 250, 281, 248

(56) References Cited

U.S. PATENT DOCUMENTS

| | | | | |
|---|---|---|---|---|
| 5,392,356 A | * | 2/1995 | Konno et al. | 455/411 |
| 5,444,764 A | * | 8/1995 | Galecki | 379/357 |
| 5,485,505 A | * | 1/1996 | Norman et al. | 455/411 |
| 5,537,474 A | * | 7/1996 | Brown et al. | 455/411 |
| 5,551,073 A | * | 8/1996 | Sammarco | 455/411 |
| 5,557,676 A | * | 9/1996 | Naslund et al. | 455/411 |
| 5,600,708 A | | 2/1997 | Meche et al. | 7/30 |
| 5,608,781 A | | 3/1997 | Seiderman | 7/22 |
| 5,661,806 A | | 8/1997 | Nevoux et al. | |
| 5,668,875 A | | 9/1997 | Brown et al. | |
| 5,884,168 A | * | 3/1999 | Kolve et al. | 455/432 |
| 5,907,804 A | * | 5/1999 | Schroderus et al. | 455/411 |
| 5,966,667 A | * | 10/1999 | Halloran et al. | 455/552 |
| 6,002,929 A | * | 12/1999 | Bishop et al. | 455/431 |
| 6,014,561 A | * | 1/2000 | Molne | 455/419 |
| 6,094,487 A | * | 7/2000 | Butler et al. | 455/410 |
| 6,097,950 A | * | 8/2000 | Bertacchi | 455/432 |

FOREIGN PATENT DOCUMENTS

| | | | |
|---|---|---|---|
| EP | 0 532 227 A2 | 3/1993 | |
| JP | 07/35680 | 5/1995 | 7/34 |
| WO | WO 95/15065 | 6/1995 | |
| WO | WO 97/22221 | 6/1997 | 7/32 |
| WO | WO 97/42783 | 11/1997 | |
| WO | WO 97/43866 | 11/1997 | 7/32 |

* cited by examiner

Primary Examiner—Nay Maung
Assistant Examiner—Tilahun Gesesse
(74) Attorney, Agent, or Firm—Burns, Doane, Swecker & Mathis, L.L.P.

(57) ABSTRACT

A dual-mode communication system made up of an AMPS network and a GSM network provides for communication to and from dual-mode terminals equipped with corresponding SIM cards. The mobile terminals store a terminal-based ESN, and the SIM cards store a SIM-based ESN and MIN. The dual-mode system uses the terminal-based ESN and MIN for registration in the AMPS network. For authentication purposes, however, the dual-mode system uses the SIM-based ESN for key-based authentication in the AMPS network.

15 Claims, 5 Drawing Sheets

Block Diagram of a Dual-Mode Communication System

Block Diagram of a Dual-Mode Communication System

Block Diagram of a Dual-Mode Terminal

Overview of AMPS Call Establishment Protocol

Fig. 4
AMPS Registration/Authentication Words

Word A

| F =1 | NAWC | T | S | E | RSVD = 0 | SCM | MIN1 | P |
|---|---|---|---|---|---|---|---|---|
| 1 | 3 | 1 | 1 | 1 | 1 | 4 | 24 | 12 |

Word B

| F = 0 | NAWC | LOCAL | ORDQ | ORDER | LT | RSVD = 0 | MIN2 | P |
|---|---|---|---|---|---|---|---|---|
| 1 | 3 | 5 | 3 | 5 | 1 | 8 | 10 | 12 |

Word C - Serial Number Word

| F = 0 | NAWC | Serial Number | P |
|---|---|---|---|
| 1 | 3 | 32 | 12 |

Word C - Authentication Word

| F = 0 | NAWC | COUNT | RANDC | AUTHR | P |
|---|---|---|---|---|---|
| 1 | 3 | 6 | 8 | 18 | 12 |

Overview of Generic GSM-1900/AMPS
Inter-Working Function (IWF) Structure

SUBSCRIBER VALIDATION METHOD IN CELLULAR COMMUNICATION SYSTEM

TECHNICAL FIELD

This invention relates to the field of communication systems, and more particulary to a method of preventing unlawful use of a mobile terminal operating in a communication system.

BACKGROUND

In mobile telecommunication networks, such as the widely used cellular networks, subscribers with mobile terminals, for example, a portable mobile terminal, are identified within the network through one or more ID codes. Generally, a terminal-specific ID code identifies the mobile terminal, and a subscriber-specific ID code identifies a subscriber to the network. At predefined intervals, such as when placing a call, the mobile terminal transmits the ID codes to the network. Before establishing the call, the network verifies the authenticity of the IDs using one of a variety of validation procedures. Once the ID codes are verified, the network allows the call to proceed. Otherwise, the network declines the call.

In some instances, however, the integrity of the validation procedure may be compromised, resulting in unauthorized use of the network, for example, when the mobile terminal is stolen. Other instances of unauthorized use may occur by acquiring the ID codes illegally from the mobile terminal, for example, by reading the stored IDs from the terminal or intercepting them during transmission. Consequently, there is demand for preventing unauthorized use of the network.

The validation procedure in an analog communication network known as Advanced Mobile Phone System (AMPS), which is employed in North America under EIA/TIA 553A standard, includes a registration process that relies on two ID numbers: an electronic serial number (ESN), which is a terminal specific ID and a mobile identification number (MIN), which is a subscriber specific ID. The ESN is a 32-bit hardware-based serial number composed of two parts: an 8-bit Manufacturer Code that identifies the maker of the mobile terminal, and a 24-bit Identification Number that is unique to that mobile for the given Manufacturer Code. The MIN corresponds to a user telephone number assigned when a subscriber account is opened. Both the ESN and MIN are stored in the mobile terminal, usually in a non-volatile memory such as an EEPROM (electrically erasable programmable read-only memory). Under the AMPS specification, at specified instances, such as upon power up, a mobile terminal operating in the AMPS system transmits the ESN and MIN to the network for registration. In other instances, the mobile terminals transmit the ESN and MIN when placing a call or when transitioning from one network to another.

Some of the early installed AMPS systems use a simple and rudimentary subscriber validation process that can subject the network to frequent instances of unauthorized use. The subscriber validation process in the early AMPS systems consists of verifying whether the transmitted ESN and MIN from the mobile terminal are registered in the network as corresponding to each other or not. Also verified is whether the received ESN is listed in a black list of reported stolen terminals. Upon verification of a non-black listed ESN and its correspondence with the received MIN, the network would allow the call to proceed.

Not long ago, the cloning of stolen terminals, the process of reading the ESN of an authentic paying subscriber from the EEPROM, was a common practice for unauthorized use of the terminal. One conventional measure for preventing unlawful reading of the ID codes encrypts the codes, before writing them into the mobile terminal. The terminal then un-encrypts the codes before transmitting them to the network. Because the ID codes are transmitted un-encrypted, however, this measure does not provide any protection against unauthorized over-the-air interception of the codes during transmission to the network. Therefore, a more elaborate validation process was devised to insure against the unauthorized interception of the ID codes.

More advanced AMPS systems use a key-based authentication procedure to validate the generated calls. Under this arrangement, the ESN and MIN are keyed with a hidden Authentication key (A-key), which is known to the network operator. In authenticating AMPS systems, a Shared Secret Data (SSD) is used in the authentication process. Under a procedure described in EIA/TIA 553A, the SSD is derived from the A-key and the ESN. Based on the SSD, an authentication algorithm in the terminal produces a terminal authentication result (AUTHR), which is transmitted to the network along with the ESN and MIN. Upon receipt, the network registers the terminal, and based on the received MIN, produces a network generated AUTHR. The network then determines whether the terminal generated AUTHR matches the network generated AUTHR. If so, the network allows the call to proceed. In this way, the key-based authentication process eliminates or substantially reduces the risk of fraudulent over-the-air interception of the IDs.

A similar key-based authentication process is used in Global System for Mobile Communications (GSM) radio-telephone system, which is currently in use in Europe and other parts of the world. In the GSM systems, a Subscriber Information Module (SIM) card is inserted into the mobile terminal for providing subscriber identification, billing information and other information concerning the operation of the mobile terminal. Each GSM mobile terminal has a terminal-based International Mobile Equipment Identity (IMEI), which is stored in the GSM terminal. Each GSM subscriber is identified by a SIM-based International Mobile Subscription Identity (IMSI) belonging to a specific SIM card. The IMSI, which corresponds to AMPS MIN, is also referred to as the SIM-ID. Upon a subscriber application, the system operator issues a SIM-ID number and a SIM card that when inserted in the GSM mobile terminal, enables the subscriber to use the services provided by the operator. In this way, the same GSM terminal can be used with any SIM card inserted into the GSM mobile terminal.

Under GSM authentication processes, a GSM authentication algorithm keys the SIM ID with a hidden authentication key, known as Ki, which corresponds to AMPS A-key. Similar to the AMPS authentication process, the terminal and network generated authentication results are compared for authenticating each call. Unlike AMPS authentication process, which uses the terminal-specific ESN, the GSM authentication process uses only the SIM-based Ki, and the subscriber-specific SIM-ID. Thus, a valid SIM card may be used with any valid GSM mobile terminal, because the GSM specification does not link a terminal-specific IMEI validation process to a subscriber specific IMSI validation process.

With the introduction of dual-mode mobile phones that operate under the GSM-1900/AMPS dual-mode environment, a removable SIM card storing the MIN allows subscribers to easily move the AMPS subscription data from one physical mobile terminal to another, without network assistance. As such, the dual-mode system provides for the capability of handling changes in the ESN that may occur when the SIM card is removed from one mobile terminal and inserted into another by associating each MIN with multiple ESN's or a range of ESN's. Because the early AMPS networks do not perform a key-based authentication, the association of a single MIN with multiple ESNs increases the possibility of fraud in the non-authenticating AMPS networks.

In order to diminish the possibility of fraud in the AMPS networks, it would have been desirable to incorporate the ESN and the MIN together on the SIM card, where a set of SIM-based MIN and SIM-based ESN could have been transmitted together. This SIM-based ESN could also have been used to generate the authentication result AUTHR, thereby safely linking the ESN and MIN values together. However, current U.S. Federal Communications Commission (FCC) regulations require that a terminal-based ESN, which is embedded, i.e., hard wired, to the terminal, be transmitted in the system access response from the mobile terminal to the network. In fact, the GSM-1900/AMPS Dual-Mode specification has reserved a secondary ESN on the SIM card. However, the specification is silent as to how this secondary ESN may be used in the authentication process. The Personal Communication Systems Universal Identity Module (PCS UIM) Specification allows for both a mobile terminal-based and a UIM/SIM-based ESN. Given the FCC requirements, however, the PCS UIM does not currently provide any way to use the SIM-based ESN. This specification has been written to support a SIM based ESN authentication if and when the FCC regulation is changed to allow such authentication.

Moreover, if the ESN is changed as a result of inserting a new SIM card from one terminal into another, the SSD must be updated to accommodate the change in the ESN. The algorithm for updating the SSD is complicated, taking a substantial amount of time, usually in the range of 4–5 seconds, each time the SSD is to be updated.

In view of the current FCC regulation, therefore, there exists a need for providing a fast authentication process that supports SIM cards in the dual-mode communication system, while reducing the risk of fraud in the early non-authenticating systems and maintaining backward compatibility with existing systems.

SUMMARY

Briefly, the present invention is embodied in a dual-mode communication system within which a dual-mode terminal equipped with a SIM card operates. The dual-mode system includes a first network, such as the AMPS network, and a second network, such as the GSM network. The validation method of the present invention uses a terminal-based ESN for registration in the first network, a SIM-based ESN for a key-based authentication process in the first network, and a non-ESN key-based authentication process in the second network. The dual-mode terminal stores the terminal-based ESN, and the SIM card stores the SIM-based ESN.

BRIEF DESCRIPTION OF DRAWINGS

FIG. 4 is a diagram of validation Words communicated during the authentication and registration processes of the AMPS network.

DETAILED DESCRIPTION

Figure 1:
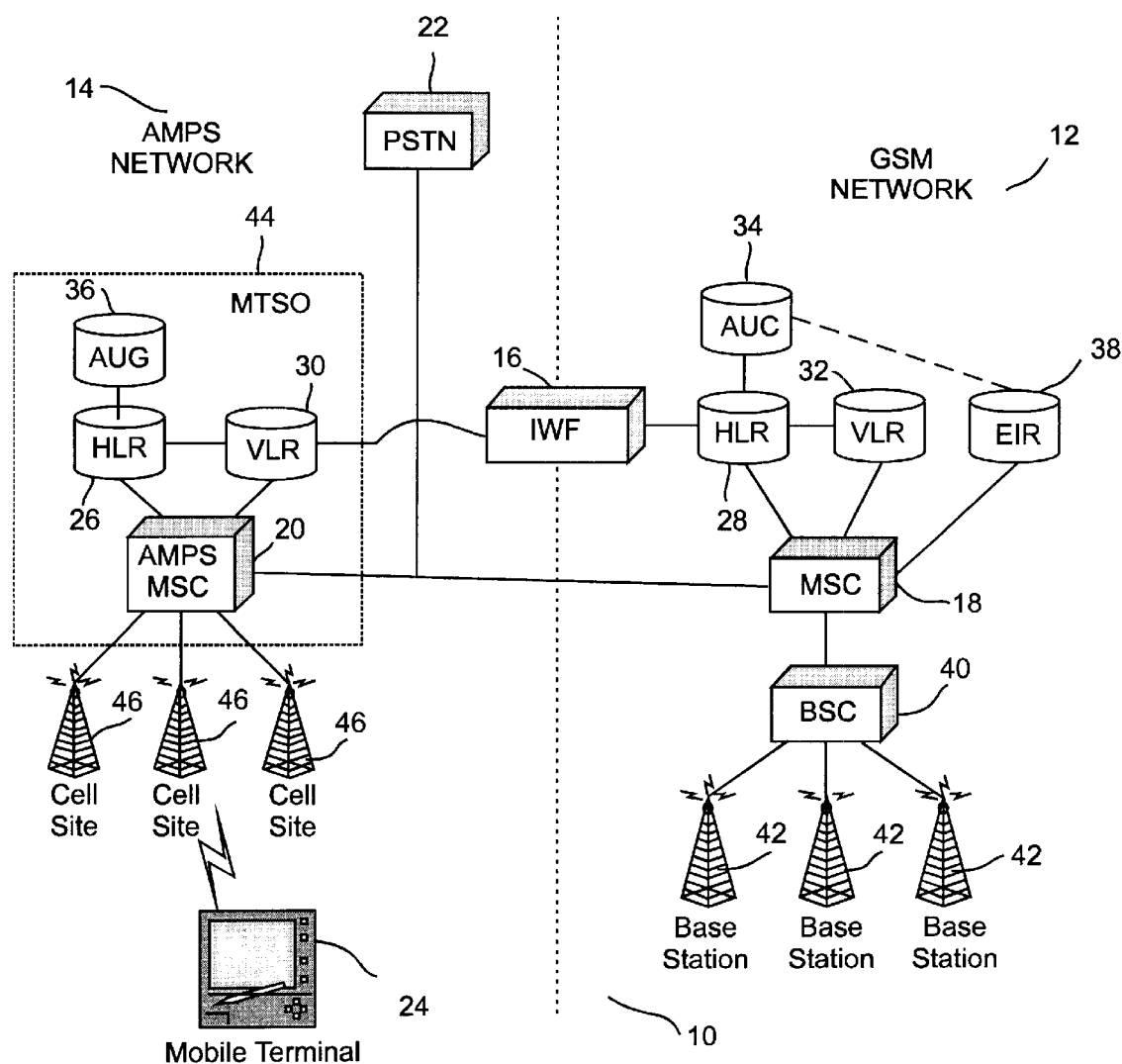
FIG. 1 is a block diagram of a dual-mode communication system that advantageously incorporates the present invention.

Referring to FIG. 1, a block diagram of a dual-mode communication system 10 that advantageously incorporates the present invention is shown. In an exemplary embodiment, it is assumed that the dual-mode communication system 10 supports both the digital GSM-1900 and analog AMPS standards. As such, the system 10 includes a GSM network 12 and an AMPS network 14, which in the exemplary embodiment of system 10 interface with each other via an inter-working function (IWF) block 16, a detailed description of which is given in connection with FIG. 5 below. Because the modes of operation of GSM and AMPS networks 12 and 14 are well known, the dual-mode communication system 10 is described to the extent necessary for understanding the present invention.

In essence, all cellular networks, including GSM and AMPS networks 12 and 14, have a similar structure, being complete telephone networks in their own right, with dedicated exchanges within an interconnected network, and with base stations connected to the exchanges. There are, however, many ways of planning a cellular network in practice, the optimum arrangement for any particular application being dependent upon the capacity required, cost of implementation, capabilities of the chosen manufacturer's equipment, etc.

Both the GSM and AMPS networks 12 and 14 include fixed networks, which perform several fundamental tasks, including connecting all base stations covering corresponding cells or clusters to each other for the purpose of communicating signals and messages to and from subscribers operating in their respective network. The fixed network of each one of the GSM and AMPS networks 12 and 14 has one or more GSM and AMPS Mobile Switching Centers (MSC) 18 and 20, respectively, that are responsible for directing traffic around their respective networks. The MSCs 20 and 18 are associated with corresponding home location registers (HLR) 26 and 28 and visitors location registers (VLR) 30 and 32. It would be appreciated that the VLRs and HLRs need not be physically associated with the location of their MSC, since the fixed network gives full connectivity. Generally, the MSCs 18 and 20 are connected to a public switching telephone network 22 (PSTN), to give connectivity between fixed landline subscribers and mobile subscribers.

The mobile subscribers of the system 10 each carry a mobile terminal, which in the preferred embodiment of the invention comprises a dual-mode terminal 24 capable of operating in the GSM and AMPS networks 12 and 14. As described later in detail, the dual-mode terminal 24 includes a removable Subscriber Information Module (SIM) card, similar to the one used by an existing GSM mobile terminal, which carries subscriber identification, billing information and other information concerning the operation of the dual-mode terminals.

For the GSM and AMPS networks 12 and 14, the dual-mode system 10 performs independent validation procedures involving a key-based authentication process. In the GSM network 12, the authentication process is performed by an authentication center (AUC) block 34, which may be a part of the GSM HLR 28. As briefly described in the background section of the application, the authentication process in the GSM network 12 compares a terminal generated AUTHR with a network generated AUTHR to validate the GSM call. As is conventional, an equipment identity register (EIR) block 38 determines whether a terminal is black listed.

In the AMPS network 14, the validation procedure includes a registration process and a authentication process, which, similar to authentication process of the GSM network 12, is a key-based authentication process. The authentication process in the AMPS network 14 is performed by an AUC block, which is usually associated with the AMPS HLR of the subscriber's "home" AMPS system. For the purpose of describing the present invention, the AUC block and the subscriber's "home" HLR are described below as part of the IWF block 16.

According to the present invention, the dual-mode terminal 24 stores a first ESN (hereinafter referred to as the terminal-based ESN), which is specific to the dual-mode terminal 24. The SIM card stores a second ESN (hereinafter referred to as the SIM-based ESN), which is specific to the SIM card. Along with the SIM-based ESN, the SIM card also stores a MIN, which is assigned to the subscriber by the communication service provider. The dual-mode terminal 24 uses the terminal-based ESN and the MIN for the registration process, and it uses the SIM-based ESN for the AMPS key-based authentication process. Under this arrangement, the dual-mode terminal 24 also operates compatibly with the non-authenticating AMPS systems by using the existing registration process, while supporting the key-based authentication processes of the AMPS and GSM networks 14 and 12.

The GSM network 12 uses a base station controller (BSC) 40 for controlling base stations, covering corresponding clusters or cells. The primary function of the BSC 40 is radio resource management. For example, based on reported received signal strength at the dual-mode terminal 24, the BSC 40 determines whether to initiate a hand over. The BSC 40 communicates with the MSC 18 using a standard interface. The BSC 40 controls a group of GSM base stations, known as base transceiver stations (BTSs) 42. Each BTS 42 includes a number of TRXs (not shown) that use digitally encoded bursts over uplink and downlink RF channels, to serve a particular common geographical area. Therefore, the BTSs 42 primarily provide the RF links for the transmission and reception of data bursts to and from the dual-mode terminal 24 within its designated cell. It should be noted that although the exemplary embodiment is described in terms of the GSM network 12, the dual-mode system 10 may include various other TDMA or CDMA digital networks, such as those based on the IS-136 or IS-95 standards, as well as other analog networks, such as those based on the ETACS standard.

An AMPS national switching network can consist of over 20 MTSOs, one of which is shown as block 44 in FIG. 1. Each MTSO 44 consolidates the corresponding functionalities of the AMPS MSC 20, VLR 30, HLR 26 and AUC 36, which are shown as separate blocks in FIG. 1. The MTSOs 44 are digital exchanges with a distributed control architecture, especially adapted for operation in the cellular environment. The MTSOs 44 are also linked together with digital circuits forming a fully interconnected network. The signaling between base stations and switches, and between switches, is usually proprietary in nature, and is carried in time slots on the digital circuits.

In the exemplary AMPS network 14, sets of cells are connected in turn to the MTSO 44. Unlike the GSM network 12, in the AMPS network 14 and other analog cellular networks, the base station controller is a part of the AMPS MSC 20. For much of the network, base stations 46 are organized in a 7-cell or 12-cell repeat pattern with omnidirectorial coverage from each base station. Most base stations 46, which are connected to the AMPS MSC 20 by digital (2 Mbps) leased lines, have between 20 and 30 voice channels, with one signaling, or control, channel carrying all paging and access functions.

Figure 2:
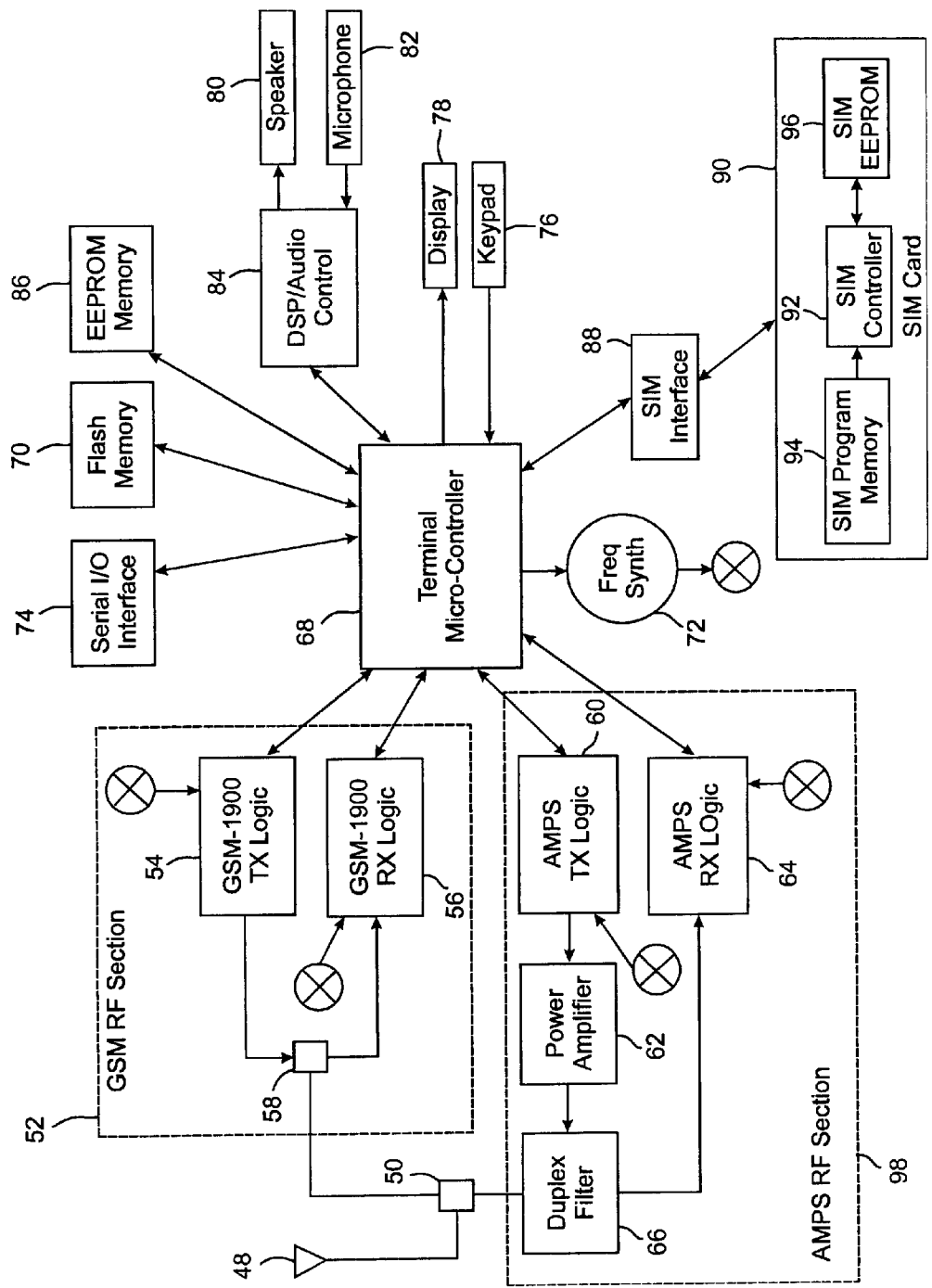
FIG. 2 is a block diagram of a dual-mode terminal that operates in the system of FIG. 1.

Referring to FIG. 2, a block diagram of the dual-mode terminal 24 is shown. Through an antenna 48, the dual-mode terminal 24 receives and transmits properly modulated radio frequency signals in a well known manner. Depending on the operating mode, an AMPS/GSM switch 50 couples the antenna 48 to either a GSM RF section 52 or an AMPS RF section 98.

The GSM RF section 52 includes a well known GSM-1900 TX Logic block 54 and a well known GSM-1900 RX Logic block 56, which are selectively coupled to the antenna 48 via a GSM RX/TX switch 58. Similarly, the AMPS RF section 98 includes a well known AMPS TX Logic block 60, a Power Amplifier block 62 and a well known AMPS RX Logic block 64, which are coupled to the antenna 48 via a well known duplex filter 66.

By executing a program stored in a flash memory 70, a micro-controller 68 controls the overall operation of the dual-mode terminal 24, including the GSM and AMPS RF sections 52 and 98. For example, the micro-controller 68 controls the operation of a frequency synthesizer 72 that provides the operating frequencies of the GSM and AMPS RF sections 52 and 98. In a well-known manner, the micro-controller 68 also interfaces with a serial I/O interface 74, a keypad 76, a display 78, as well as a speaker 80 and a microphone 82 via a DSP/audio control block 84.

As described above, the dual-mode terminal 24 has a terminal-based ESN, which is stored in a terminal EEPROM 86. Through a SIM interface 88, the dual-mode terminal is equipped with a removable SIM card 90, which operates under the control of a SIM controller 92 executing a SIM operation program stored in a SIM memory 94. A SIM EEPROM 96 stores many subscriber related information as well as the SIM-based ESN and MIN. In the AMPS network 14, the MIN allows the calls to be accepted or received as well as for allowing the billing of the call charges to a particular subscriber.

Unlike the fixed public telephone network (PSTN), in the GSM and AMPS networks 12 and 14, "roaming" subscribers could be found anywhere within the network, which in the case of several systems can extend over national borders. Therefore, a very large amount of signaling overhead is required over a control channel (CC) to allow subscribers to call or be called within the network. The AMPS network 14 sets up each dual-mode terminal on a free channel in a cell when it calls, or is called by the local base station.

Figure 3:
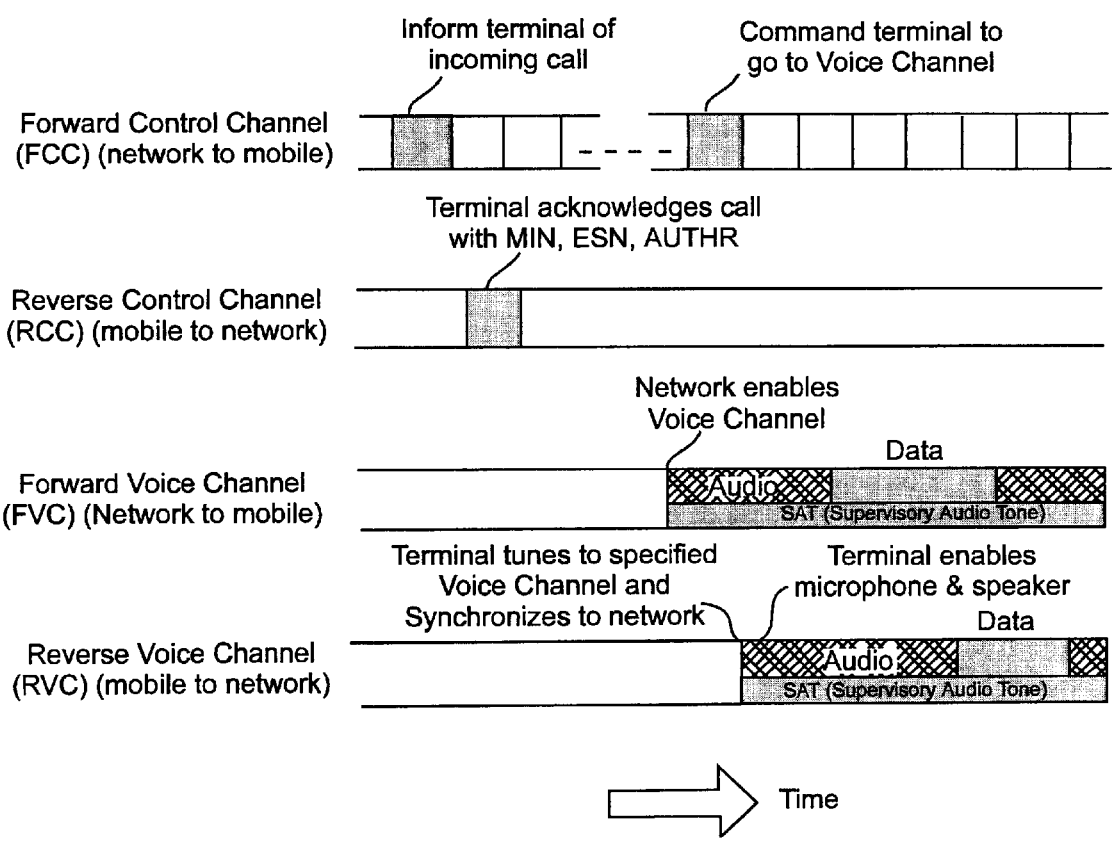
FIG. 3 is a diagram of a protocol for establishing a call in an AMPS network of the communication system of FIG. 1.

FIG. 3 shows a diagram of a signaling arrangement for granting a particular pair of voice channels to the dual-mode terminal 24, while it is operating in the AMPS network 14. The signaling protocol involves call request, handshake and connect procedures. The AMPS network 14 uses four RF channels, namely a forward control channel (FCC), a reverse control channel (RCC), a forward voice channel (FVC), and a reverse voice channel (RVC), to establish a call. The FCC is a globally accessible control channel used by the AMPS network 14 to continuously transmit a synchronous control data stream from the base stations 46 to the dual-mode terminal 24. Conversely, the RCC is a control channel shared by the dual-mode terminal 24 and other terminals to asynchronously send information back to the AMPS network 14. FVC and RVC are dedicated voice channels to and from the dual-mode terminal 24, respectively, carrying speech and data information between the terminal 24 and network 14. While data is transmitted on these voice channels during a call, the speech path is muted to prevent what would appear as interference to the speech circuit.

Operationally, when the dual-mode terminal 24 is operating in the AMPS network 14, its data is retrieved from the IWF 16 and stored in the VLR 30 for the MSC 20, which serves the cells in the area where the dual-mode terminal 24 is located. The IWF 16 notes the identity of the current VLR 30 and the fact that the dual-mode terminal 24 is active. Incoming calls for the dual-mode terminal 24 interrogate the IWF 16, based on knowledge of the terminal's MIN and where each MIN is stored. If the dual-mode terminal 24 is active, the call is routed to the appropriate VLR 30 for paging the dual-mode terminal 24. Periodically (typically every 15 minutes), the dual-mode terminal 24 re-registers itself to let the AMPS network 14 know that it is still active and allow the system to determine where within its cells the terminal is located.

In the AMPS network 14, the MSC 20 periodically issues registration commands to all dual-mode terminals, including the dual-mode terminal 24, listening to the MSC's FCC. As explained above, under the present invention, the dual-mode terminal 24, when operating in the AMPS network 14, registers in the network using the MIN and the terminal-based ESN. As such, after determining a proper time to register, the dual-mode terminal 24 builds and transmits a registration response to the MSC 20. This registration response includes Words A and B, which include the MIN, and Word C, which includes the terminal-based ESN. The formats of Words A, B, and C are shown in FIG. 4.

For the authentication process under the present invention, however, the dual-mode terminal 24 also transmits an AUTHR using an Authentication Word C, which is derived based on the SIM-based ESN and a hidden SSD. The format of this additional Word C is also shown in FIG. 4. AUTHR is computed by sending an Authentication Data request to the SIM card 90, which executes its internal AMPS Authentication algorithm (using the SSD and SIM-based ESN) and returns the result to the dual-mode terminal 24. The dual-mode terminal 24 transmits the MIN, AUTHR, terminal-based ESN to the VLR 30 via the cell site 46 and AMPS MSC 20. The VLR determines which AMPS network (IS-41) node corresponds to this dual-mode terminal's home system. The VLR then passes the data to that node.

Figure 5:
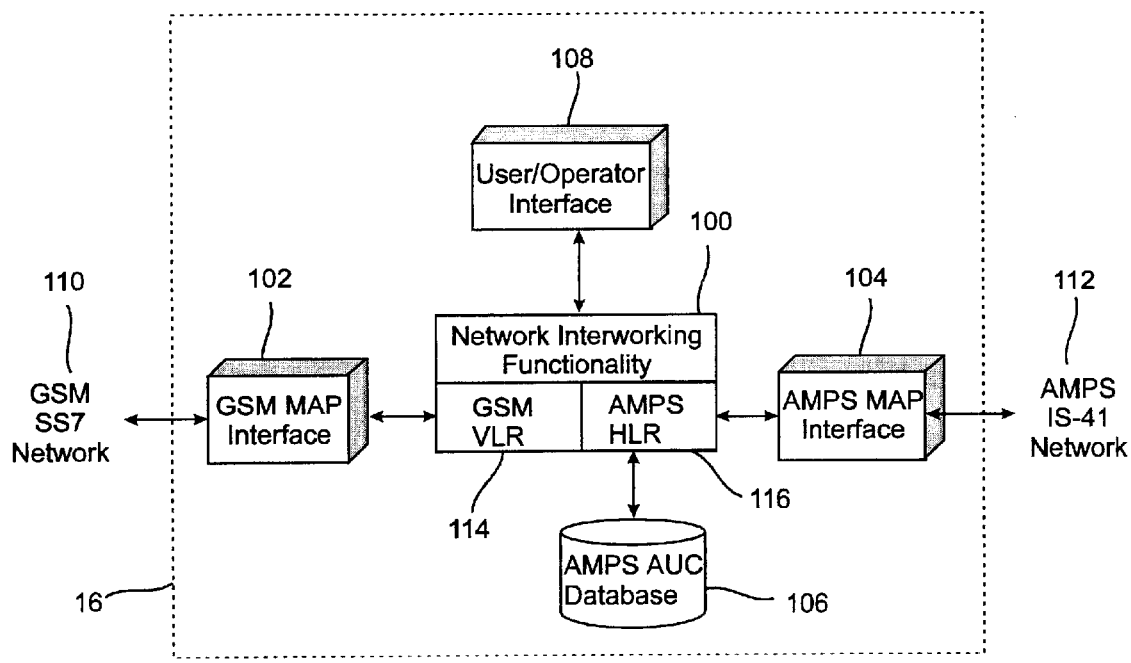
FIG. 5 is a block diagram of an inter-working function block used in the dual mode communication system of FIG. 1.

Referring to FIG. 5, a block diagram of the IWF block 16 is shown. The IWF block 16 is the bridge between the AMPS IS-41 network 112 and the GSM SS7 network 110. In the exemplary embodiment of system 10, the IWF block 16 is loosely associated with the GSM network 12. Using a GSM interface 102, the IWF block 16 acts as a standard GSM VLR 114. Using an AMPS interface 104, the IWF block 16 acts as a standard AMPS HLR 116. When data needs to cross the boundary between the AMPS and GSM networks, an Interworking Function 100 is used to convert the data from the format of the supplying network into the format expected by the target network. The AMPS HLR 116 portion of the IWF block 16 has an associated AMPS Authentication Center Database 106, which is used for validating both the terminal and subscriber ID codes supplied by the terminal 24 during registration and authentication. This database contains records corresponding to each valid subscriber for its system. Each such subscriber record contains the values for the SIM-based MIN, A-Key, SSD, the terminal-based ESN, roaming information, such as in which AMPS system the terminal is currently active, and additional parameters, such as a Customer Service Profile, that defines terminal supported features. In the exemplary embodiment of the present invention, each subscriber record stored in the AUC database 106 contains an additional field for the SIM-based ESN. These subscriber records can be added, examined, updated, and deleted, and the IWF block 16 functionality fine tuned, through a user/operator interface 108.

In the preferred embodiment of the invention, the home AMPS system node is the AMPS HLR 116 portion of the IWF block 16 that is also connected to the dual-mode terminal's home GSM network 12. The IWF block 16 verifies, via its internal database 106, that the ESN is not blacklisted. According to the present intention, the AMPS HLR 116 portion of the IWF block 16 then computes its own version of AUTHR, using its copy of the SSD and SIM-ESN values fetched from the AUC database 106. If the IWF-computed AUTHR value matches the terminal generated AUTHR value, the GSM VLR 114 portion of the IWF block 16 informs the terminal's home GSM HLR 28 that the terminal has successfully registered with the AMPS MSC 20, and passes a Authentication Registration success message back to the AMPS VLR 30. The VLR 30 processes the success message, validating the dual-mode terminal 24 within its database, then passes the success message along to the dual-mode terminal 24, via the MSC 20. The dual-mode terminal 24 accepts the success status, updates internal flags and counters, and resumes listening for pages from the AMPS MSC 20.

Therefore, in the present invention, the dual-mode terminal 24 uses the terminal-based ESN in the standard AMPS Serial Number Word C, for registration, but uses the SIM-based ESN to generate the AUTHR value returned in the standard AMPS Authentication Word C, for the authentication process. The SIM-based ESN can be safely provided to the system operators just as are today's A-Key and Ki/Ke values, thereby reducing fraud in the dual-mode communication system 10. The SIM-based ESN could act as a second hidden key, like the A-Key, making an authentication algorithm, deemed safe today, virtually impossible to crack. In the preferred embodiment, the SIM-based ESN includes 32 bits, resulting in 64 out of the 128 AUTHR input bits being secret data. Unlike the terminal-based ESN, the SIM-based ESN does not require any fixed sized subfields, namely the 8-bit manufacturer code and the 24-bit Identification Number. Rather, the 32-bit SIM-based ESN can be generated by the operator or SIM card manufacturer by whatever method they choose. Also, unlike the terminal-based ESN, the SIM-based ESN does not need to be unique for each SIM card although in practice a large number of SIM-based ESN's should be used to increase randomness and reduce predictability. The present invention also maintains compatibility with the non-authenticating AMPS systems, for example, allowing system operators to track hardware problems by manufacturer, while complying with the FCC guidelines. Moreover because no SSD updates need to be made, the present invention reduces system-mobile communications when a new dual-mode terminal is used, as the dual-mode terminal ESN is no longer a part of the validation process. The user can immediately use a new dual-mode terminal in an authenticating AMPS system with this approach, instead of waiting up to several minutes for an SSD update procedure to finish, for example, after an authentication failure has occurred. The IWF block 16 simply updates its records with the new dual-mode terminal ESN after it has successfully authenticated the subscriber.

What is claimed is:

1. In a dual-mode communication system having a first network and a second network serving at least one dual-mode terminal equipped with a Subscriber Information Module (SIM) card, a subscriber validation method comprising the steps of:

performing a registration process in the first network using a terminal-based Electronic Serial Number (ESN); and performing a key-based authentication in the first network based on a SIM-based ESN.

2. The method of claim 1, wherein the first network is an analog network.

3. The method of claim 2, wherein the second network is a digital network.

4. The method of claim 3, wherein the first network is an AMPS network and the second network is a GSM network.

5. The method of claim 1 further including the steps of:

interfacing the first network with the second network via an interworking function (IWF) having an authentication database; and performing the key-based authentication based on SIM-based ESN information stored in the authentication database.

6. The method of claim 5, further including the step of performing the key-based authentication that includes comparing an IWF-generated authentication result with a terminal generated authentication result.

7. The method of claim 1, wherein the step of performing a key-based authentication in the first network based on a SIM-based ESN comprises the steps of:

retrieving the SIM-based ESN from a memory of the SIM card;

generating a first terminal authentication result (AUTHR) based on the SIM-based ESN;

transmitting the first AUTHR to the first network;

generating a second AUTHR at the first network based on a SIM-based ESN stored in an authentication database of an interworking function (IWF); and matching the first AUTHR and second AUTHR.

8. In an analog communication system having at least one mobile terminal equipped with a Subscriber Information Module (SIM) card, a validation method comprising the steps of:

transmitting a Mobile Identification Number (MIN);

transmitting from the mobile terminal a first Electronic Serial Number (ESN); and transmitting an authentication result, wherein said authentication result is derived based on a second ESN.

9. The method of claim 8, wherein the first ESN is stored in the mobile terminal and the second ESN and MIN are stored on the SIM card.

10. A dual-mode communication system, comprising:

a first network;

a second network;

at least one dual-mode terminal, including a Subscriber Information Module (SIM) card, a transmitter for transmitting a terminal-based Electronic Serial Number (ESN) for registration in the first network using; and transmitting a SIM-based ESN for performing a key-based authentication in the first network.

11. The system of claim 10, wherein the first network is an analog network.

12. The system of claim 11, wherein the second network is a digital network.

13. The system of claim 12, wherein the first network is an AMPS network and the second network is a GSM network.

14. The system of claim 10 further including an IWF block that interfaces the first network with the second network, the IWF block having an authentication database used for the key-based authentication.

15. The system of claim 14, wherein the IWF block performs the key-based authentication by comparing an IWF-generated authentication result with a terminal generated authentication result.

* * * * *